Dec. 5, 1967   G. CERLES ETAL   3,356,352
COOLER FOR FINELY DIVIDED MATERIALS AND METHOD
Filed Dec. 9, 1964
FIG. 1
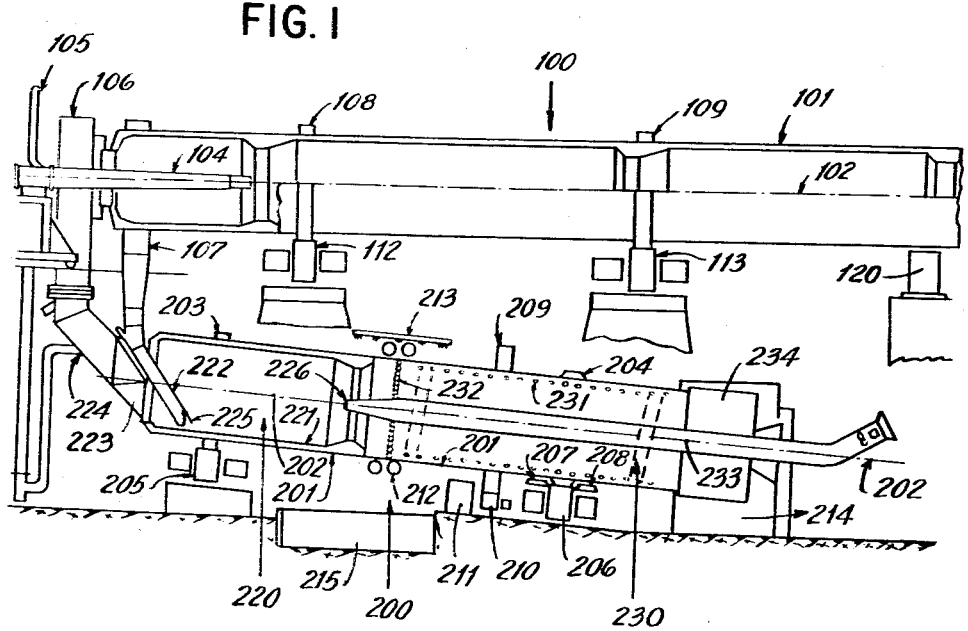
FIG. 3
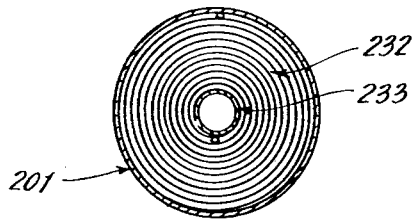
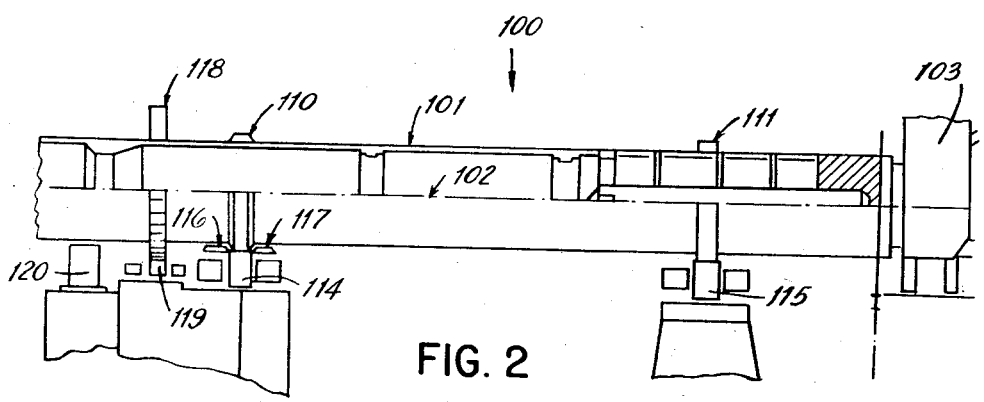
FIG. 2
INVENTORS
GEORGES CERLES & EMILE DUPUY
BY
McDougall, Hersh & Scott
ATTY United States Patent Office 3,356,352
Patented Dec. 5, 1967

3,356,352
COOLER FOR FINELY DIVIDED MATERIALS
AND METHOD
Georges Cerles, Gardanne, and Emile Dupuy, Grenoble, France, assignors to Pechiney, Compagnie de Produits Chimiques et Electrometallurgiques, Paris, France
Filed Dec. 9, 1964, Ser. No. 417,088
Claims priority, application France, Dec. 18, 1963, 957,655
15 Claims. (Cl. 263—32)

This invention relates to the cooling of pulverulent materials which have been raised to elevated temperature as by the processes of calcination and the like.

In the manufacture of particulate materials by calcination of hydrated products, it is known to effect cooling of the materials by the use of air adapted to be employed in the combustion for generation of heat for the calcination process thereby simultaneously to recover heat from the calcined material for more efficient combustion.

In one known arrangement, the calcination takes place in a rotary kiln in the form of a long cylindrical furnace which turns about its axis and in which the heat necessary for the calcination is supplied at one end by a burner which makes use of liquid or powdered fuels. The furnace is associated with a cooler which may also be in the form of an inclined, rotatable tubular kiln in which the calcined material is advanced from an inlet at the top to an outlet at the bottom in countercurrent flow with air subsequently to be used for combustion.

This arrangement operates in a satisfactory manner for use with materials which are of sufficiently large particle size as to resist entrainment within the air stream, such as of clinkers in cement works, but it is difficult to employ the system in the calcination of very fine pulverulent materials, such as lime, alumina and certain ores, such as the ores of nickel, because the fine particles become entrained in the ambient air stream. These particles then form a barrier to the heat radiation from the burner flame and in order to achieve the same final temperature in the product to be calcined, an increase in the fuel consumption is often required to cause considerable increase in the temperature of the exhaust gases issuing from the outlet.

It is an object of this invention to provide a method and means to effect cooling of calcined particulate materials with gases to be used in combustion but without entrainment of particulate materials into the gaseous stream, and it is a related object to provide a new and improved cooler for use in the practice of same.

These and other objects and advantages of this invention will hereinafter appear and for purposes of illustration, but not of limitation, an embodiment of the invention is shown in the accompanying drawing, in which:

FIG. 1 is a schematic elevational view of the processing unit embodying the practice of this invention including the cooler and calcination devices; and FIG. 2 is a schematic elevational view of a cooler embodying the features of this invention; and FIG. 3 is an elevational view of the screening member for separation of the casing into an upper chamber and a lower chamber.

In accordance with the practice of this invention, the desired improvements are achieved by the construction of a cooler subdivided lengthwise into two sections, including a first section in which the calcined pulverulent material is cooled by direct heat exchange with the cooling gas in a static atmosphere and a second section in which the calcined pulverulent material is cooled by indirect heat exchange with a liquid coolant while the pulverulent material is in a state of agitation with the outlet of the combustion air from the cooler being separated from the inlet of the calcined pulverulent material into the cooler by reason of their passage through different conduits.

In accordance with the practice of the invention, the cooler is in the form of an elongate tubular member inclined at a slight angle to the horizontal and mounted for rotational movement about its axis.

A screen separates the casing into two chambers which are interconnected by a pipe to permit the pulverulent material cooled in the upper chamber from its calcination temperature to an intermediate temperature to enter the lower chamber in which it is cooled from the intermediate temperature. The upper chamber is lined with a refractory brick resistant to the elevated temperatures of calcination.

The upper portion of the upper chamber is provided with a pipe for the introduction of calcined material which has an outlet controlled by a non-return valve in the vicinity of the lower generatrix of the chamber and it is also provided with an outlet pipe for the heated combustion air having its inlet in the axial region of the cooler. The inner portion of the upper chamber is provided with a distribution diffuser for the distribution of cooling air entering the chamber. The lower chamber is lined with coils through which cooling water or other fluid is circulated and it is provided along its axis with a tube through which the cooling air is transported to the diffuser in the upper chamber and which extends centrally through the lower chamber and through the separating screen into the diffuser for the distribution of air into the upper chamber.

Entrainment of the pulverulent material is avoided by separating the circulating air from the calcined pulverulent material. This is achieved on the one hand with the recovery in two stages of heat by the cooling air to be used for combustion. In the one stage, the air recovers heat by direct contact with the pulverulent material in a static atmosphere. In the other stage, heat is recovered by indirect contact with the pulverulent material while in a stage of agitation. Entrainment of pulverulent material into the air stream is avoided on the other hand by separation of the inlet pipe for the calcined material from the outlet pipe for the heated combustion air.

Referring now to the drawing, the calcination furnace 100 comprises an elongate tubular housing 101 with its axis 102 incline dslightly to the horizontal.

At the higher end, the tubular housing 101 is provided with a feed device 103 for the introduction of the material to be calcined. At the lower end, the tubular housing is provided with a burner 104 to which primary air is supplied through a pipe 105 and the burner is also supplied with secondary air through a device 106 and the lower end portion is also provided with an outlet pipe 107 for removal of the calcined pulverulent material.

The rotary kiln or tubular housing 101 is provided with longitudinally spaced bands 108, 111 on its periphery which engage rollers 112, 115 for support. The sides of the bands 110 are machined obliquely for enabling the band to be held between a pair of frusto-conical rollers 116 and 117 so as to prevent any axial displacement of the furnace.

Finally, the rotary kiln 101 is provided on its periphery with a toothed ring 118 operatively engaged by a pinion 119 which in turn is operatively connected with a reduction gear 120 adapted to be power driven by a suitable motor for rotating the tubular housing slowly about its axis.

The cooler 200 comprises an elongate tubular casing 201 having its axis 202 inclined with the horizontal and preferably disposed in the same vertical plane as the axis of the furnace 100. The cooler can be aligned with the furnace with its axis inclined in the same direction or it can, in the preferred illustrated construction, be disposed beneath the furnace with its axis inclined in the opposite direction.

The casing 201 is subdivided longitudinally by a screening member 232 into an upper chamber 220 and a lower chamber 230. In the upper chamber 220, the calcined material is cooled from substantially its calcination temperature down to an intermediate temperature in a static atmosphere by direct contact between the secondary combustion air intended to be fed to the burners 104 and the calcined material. In the lower chamber 230, the calcined material is cooled further from the intermittent temperature down to its final temperature by indirect heat exchange with a cooling liquid, such as water, circulated through coils lining the chamber 230 in which the pulverulent material is maintained in a turbulent state and also by sprinkling the walls of the housing 201.

The intermediate temperature to which the pulverulent material is cooled is selected to achieve maximum recovery of heat by the combustion air. It is, in fact, believed that the final cooling in the second lower compartment 230 is generally effected substantially with the loss of heat.

The tubular casing 201 is provided with rings 203 and 204 on its periphery for rolling contact with the rollers 205 and 206. The sides of the ring 204 are machined obliquely to enable the ring to be maintained between the two frusto-conical rollers 207 and 208 to militate against axial displacement of the cooler.

The cooler is also provided with a gear ring 209 adapted to be driven by a pinion 210 which in turn is operatively engaged by a reduction gear and motor 211 to effect rotation of the casing about its axis.

The upper chamber 220 is provided with an internal lining 221 of refractory brick capable of resisting the temperature of calcination. A tube 222, which communicates with the outlet tube 107, extends into the upper end of the housing for feeding calcined pulverulent material onto the floor at the upper end of the casing into compartment 220. This tube opens from the upper end of the chamber 220 in the region of the lower generatrix of the casing 201, the generatrix obviously changing continuously by reason of the rotational movement of the cooler about its axis. The upper end of the chamber 220 is provided at its axial region with an outlet pipe 223 for the heated air.

The tube 222 is connected to the outlet pipe 107 which receives the calcined material from the furnace 100 while the pipe 223 is connected to the secondary air inlet device 106 for the furnace. On account of the purity of the heated air which is received in pipe 223, it is also possible to make use of the heated air as primary combustion air for the burner 104 by causing the pipe 105 for the supply of primary air to communicate with a union 224 on the pipe 223.

At the end of the pipe 222 which opens into the chamber 220, there is provided a non-return valve or flat valve 225 of refractory material to block the escape of air through the circuit 222, 107.

The lower chamber 230 is internally lined with coils 231 through which cooling water is circulated. The separating screen 232 can advantageously be formed of a flat tight helically wound tube through which cooling water is also circulated.

The coils 231 are preferably suspended from a number of points such as three points on the wall of the chamber 230 in order to permit free expansions and contractions thereof.

Extending axially through the lower chamber is a tubular member 233 in which the cooling air to be heated is passed from the inlet at the bottom to the outlet at the top. The tube 233 extends through the screen 232 with its outlet end in communication with a distribution diffuser 226 in the lower part of the chamber 220. The diffuser is designed to effect uniform distribution of the air in the chamber 220 without imparting excessive velocity in the vicinity of the layer of calcined material.

A pipe 212 interconnects the chamber 220 and 230 to enable the partially cooled calcined material to pass from the chamber 220 into the chamber 230 where the cooling thereof is completed. The passage may take the form of a cylindrical coil with one or several turns or spirals and it can also be cooled by sprinkling with water at 213. The pipe is employed to insure the isolation of the atmosphere between the two chambers 220 and 230, and, at the same time, supplying the lower chamber with the calcined material.

The lower chamber may end with a drum 234 for the discharge, and optionally the screening, of the calcined and cooled material. The pulverulent material is discharged from the drum towards silos in the direction of the arrow 214.

The water trickled over the casing from the sprinklers 213 and from the coils 231 is collected in a tank 215.

The operation of the cooler is as follows:

The material calcined in the furnace flows from the upper chamber 220 through the pipes 107 and 222 after operating the non-return flat valve 225. The cooler is driven in rotation at slow speed by a motor through the reduction gear assembly 211, the pinion 210, and the ring gear 209. The movement is sufficiently slow for the calcined material to be displaced in the chamber 220 to the region of the lower generatrix so that there is little, if any, turbulence with little, if any, entrainment of calcined material into the current of air distributed by the diffuser 226. The heat exchange is effected by conduction and particularly by gaseous and solid convection with the air cooling the surface of the calcined material and the refractory lining 221, which in turn cools the calcined material when the latter comes into contact with the lining. Thus air cooling is achieved in a quiescent or static atmosphere.

The partially cooled calcined material passes from the chamber 220 through the water cooled cylindrical pipe or spiral 212 and enters the lower chamber 230 were it is cooled indirectly by the water flowing through coils 231 and the water sprinkled onto the casing 213. The calcined material falls from the end of the spiral onto the cold walls of the casing and it is continuously raised by baffles or other lifting devices mounted on the inner walls of the casing to effect turbulent movement which exists in the heat exchange with the walls.

After cooling, the material accumulates in drum 234 and is discharged from the drum in the direction of the arrows 214.

The cooling air is circulated into the lower end of the tube 233 which penetrates the screen for feeding the cooling air to the diffuser and into the upper chamber where it is heated, on the one hand, by contact with the refractory lining 221 which accumulates heat given off by the calcined material and, on the other hand, by radiation and convection from the calcined material. The heated air leaves the upper chamber through the pipes 223 and 106 for feeding as secondary combustion air into the furnace 100. By way of the union 224 on pipe 223, the heated air can also be supplied as primary air to the burner 104 through pipe 105.

By way of example, reference can be made to a device embodying the features of this invention for cooling calcined alumina made from bauxite by the Bayer process. The calcination furnace is dimensioned to have a length of 83.6 meters and an internal diameter of 3.5 meters. It has an angle of inclination of about 2% with respect to the horizontal. The burner 104 has a length of 8 meters, in which the effective length is taken from the discharge opening 107 for the alumina and it has an internal diameter of 3.5 meters. It has an angle of inclination of 3% with respect to the horizontal. The kiln has an output capacity of 630 tons of calcined alumina per day.

It will be apparent from the foregoing that we have provided new and improved apparatus for the cooling of pulverulent materials of fine dimension without entrainment of the materials into the cooling medium thereby to enable the cooling medium, when in the form of air, to be used to recover the heat of the calcined material.

It will be understood that changes may be made in the details of construction, arrangement and operation without departing from the spirit of the invention, especially as defined in the following claims.

We claim:

1. A cooler for finely divided material at elevated temperature comprising an elongate cylindrical casing, a screening member extending crosswise of the casing through which the material passes to subdivide the casing into an upper chamber and a lower chamber each of which has an upper end portion and a lower end portion and in which the screening member blocks passage of material from the upper chamber to the lower chamber, means extending through the lower chamber and the screening member for the passage of cooling gases through the lower chamber and into the upper chamber for passage in indirect heat transfer relation with finely divided material passing through the lower chamber, diffuser means in the upper chamber in communication with the means extending through the lower chamber and the screening member for distributing the cooling gases directly into the upper chamber for passage therethrough in direct heat transfer relation with the walls lining the upper chamber and the finely divided material passing through the upper chamber, outlet means in the upper end portion of the upper chamber for the removal of gases from the upper chamber and inlet means in the lower end of the lower chamber in communication with said means extending through the lower chamber and screening member for the passage of cooling gases through said means and into the upper chamber and out of said outlet means, inlet means in the upper end portion of the upper chamber, separate and apart from the outlet means, for the introduction of finely divided material at elevated temperature directly into the upper chamber and outlet means in the lower end portion of the lower chamber for removal of finely divided material from the lower chamber, a passage external of said casing communicating the lower end portion of the upper chamber with the upper end of the lower chamber for the flow of finely divided material from the upper chamber to the lower chamber, and means mounting the casing for rotational movement about its axis arranged at a slight incline with the horizontal with the upper chamber at a higher level than the lower chamber and at a rate sufficiently slow to avoid turbulence of the finely divided material whereby the finely divided material travels lengthwise through the upper chamber in direct heat transfer relation with the walls of the casing and with the cooling gases and from the upper chamber to the lower chamber for passage therethrough in indirect heat transfer relation with the cooling gases.

2. A cooler as claimed in claim 1 in which the finely divided material comprises calcined alumina.

3. A cooler as claimed in claim 1 in which the casing is mounted at an angle of about 2° to 3° with the horizontal.

4. A cooler for finely divided material at an elevated temperature comprising an elongate cylindrical casing, a screening member extending crosswise of the casing to subdivide the casing into an upper chamber and a lower chamber, means extending through the lower chamber and the screening member for the passage of cooling gases through the lower chamber and into the upper chamber for passage in indirect heat transfer relation with finely divided material passing through the lower chamber, diffuser means in the upper chamber in communication with the means extending through the lower chamber and the screening member for distributing the cooling gases directly into the upper chamber for passage therethrough in direct heat transfer relation with the walls lining the upper chamber and the finely divided material passing through the upper chamber, outlet means in the upper end portion of the upper chamber for the removal of gases from the upper chamber and inlet means in the lower end of the lower chamber in communication with said means extending through the lower chamber and screening member for the passage of cooling gases through said means and into the upper chamber and out of said outlet means, inlet means in the upper end portion of the upper chamber, separate and apart from the outlet means, for the introduction of finely divided material at an elevated temperature directly into the upper chamber and outlet means in the lower end portion of the lower chamber for removal of finely divided material from the lower chamber, a passage communicating the lower end portion of the upper chamber with the upper end portion of the lower chamber for the flow of finely divided material from the upper chamber to the lower chamber, and means mounting the casing for rotational movement about its axis arranged at a slight incline with the horizontal with the upper chamber at a higher level than the lower chamber and at a rate sufficiently slow to avoid turbulence of the finely divided material whereby the finely divided material travels lengthwise through the upper chamber in direct heat transfer relation with the walls of the casing and with the cooling gases and from the upper chamber to the lower chamber for passage therethrough in indirect heat transfer relation with the cooling gases in which the screening member comprises tightly wound tubular material forming a flat spiral and which includes means for circulating a coolant through said tubing.

5. A cooler as claimed in claim 4 in which the coolant is water.

6. A cooler as claimed in claim 1 in which the inlet means for the finely divided material comprises a tubular feed chute which enters the upper chamber at its open upper end at about the central portion thereof and extends angularly downwardly to the bottom side thereof for delivery of the finely divided material to the lower portion of the upper chamber.

7. A cooler as claimed in claim 6 which includes a flat valve on the end of the chute to prevent inflow of gas from the chamber.

8. A cooler as claimed in claim 1 in which the upper chamber is lined with a thermal insulating material.

9. A cooler as claimed in claim 1 in which the means extending through the lower chamber and into communication with the diffuser comprises an elongate tubing concentrically arranged within the chamber.

10. A cooler as claimed in claim 1 in which the lower chamber is lined with tubular heat exchange pipes and which includes means for circulating a coolant through said pipes.

11. A cooler as claimed in claim 10 in which the coolant comprises water.

12. A cooler as claimed in claim 1 in which the means communicating the upper chamber with the lower chamber for passage of material from the upper chamber to the lower chamber comprises a pipe.

13. A cooler as claimed in claim 12 in which the pipe comprises a cylindrical winding of more than one turn.

14. A cooler as claimed in claim 12 which includes means for applying a coolant onto the outer surfaces of said pipe to effect cooling of the material during passage therethrough.

15. A cooler as claimed in claim 1 which includes means on the inner surfaces of the casing in the lower chamber for agitation of the finely divided material during passage therethrough.

(References on following page)

References Cited

UNITED STATES PATENTS

| | | | |
|---|---|---|---|
| 1,582,831 | 4/1926 | Lanhoffer | 263—32 |
| 1,831,049 | 11/1931 | Treschow | 34—63 |
| 2,112,492 | 3/1938 | Hoffmann | 263—32 |
| 2,218,476 | 10/1940 | Newhouse | 263—32 |
| 2,283,129 | 5/1942 | Roubal | 263—32 |
| 2,363,390 | 11/1944 | Buehl | 165—88 X |
| 2,863,225 | 12/1958 | Prussing et al. | 34—66 X |

FREDERICK L. MATTESON, Jr., *Primary Examiner.*

D. A. TAMBURRO, *Assistant Examiner.*